Patented Mar. 19, 1940

2,194,350

UNITED STATES PATENT OFFICE 2,194,350

SYNTHETIC PRODUCT

Herbert Berg, Burghausen, Germany, assignor to Chemische Forschungsgesellschaft m. b. H., Munich, Germany, a corporation of Germany No Drawing. Application May 13, 1936, Serial No. 79,625. In Germany May 13, 1935

4 Claims. (Cl. 260—32)

This invention relates to new synthetic products suitable for utilization as adhesives, coating compositions, plastic masses, and the like, and to methods of preparing these products. More particularly, it relates to the production of mixed polymers of chloroprene with other polymerizable unsaturated organic compounds.

I have found that the mixed polymers or polymerized mixtures of chloroprene with other polymerizable unsaturated organic compounds possess certain peculiar and advantageous properties, which are not characteristic of the individual components of the mixtures. In general, the mixed polymers of the invention are characterized by greater elasticity, higher stability at low temperatures, and greater resistance to chemical action than polymerized chloroprene itself. The extent to which the properties of chloroprene are modified in these particulars depends, of course, upon the type and amount of the other component or components used, and the particular conditions under which the polymerization is carried out. In general, however, the effect of comparatively small amounts of added components on the properties of chloroprene is far in excess of that which would normally be expected. For example, mixtures of polymerized chloroprene with polyvinyl acetate retain all of the advantageous properties of polymerized chloroprene; in addition, the mixed polymer possesses strong adhesive powers which are almost entirely lacking in chloroprene. Thus, the mixed polymers can be used advantageously for adhesive purposes of many types, for example, as binding agents for pressed or molded masses, phonograph records, and the like. At the same time the mixed polymers have considerably less tendency to deteriorate on aging than has chloroprene.

Mixed polymers of chloroprene and polymerizable fatty oils yield films and coatings of superior elasticity, strength, stability at low temperatures, and resistance to the action of chemical agents. As compared to chloroprene itself, the mixed polymers have less tendency to split off hydrogen chloride; they also have better solubility properties and consequently are adaptable to a considerably broader field of utilization. As has been mentioned above one of the most surprising features of the invention is the fact that very small amounts of other polymers produce such extensive modifications in the properties of chloroprene; conversely, the addition of small amounts of polymerized chloroprene to comparatively large amounts of other polymers results in a similarly extensive modification of the properties of the mixture which is out of all proportion to the amount of modifying agent used.

The polymerizable organic compounds which I prefer to use in conjunction with chloroprene, in accordance with the invention, are vinyl compounds of all kinds and unsaturated oils of vegetable, animal, or mineral origin. As suitable examples of vinyl compounds may be mentioned vinyl alcohol and its esters, acetals, and ethers, particularly vinyl acetate and vinyl-ethyl ether; vinyl ketones, e. g. methyl-vinyl ketone, and the secondary alcohols derived from vinyl ketones; acrylic acid, methacrylic acid, itaconic acid, and their derivatives; styrol, butadiene, vinyl acetylene, divinyl acetylene and their derivatives, particularly partially hydrogenated derivatives of divinyl acetylene; polymers formed by partial or complete polymerization of any of the foregoing vinyl compounds; derivatives obtained by various reactions of polyvinyl compounds as, for example, products resulting from the partial saponification of saponifiable vinyl esters and acetals. Moreover, mixed polymers of vinyl compounds with each other or with other materials as, for example, products obtained by the joint polymerization of vinyl esters with drying oils or polymerization products of drying oils may be used to advantage under certain circumstances.

Among the unsaturated oils which are preferred for forming mixed polymers with chloroprene may be mentioned linseed oil, soya bean oil, castor oil, wood oils, various types of train oils and mineral oils which contain unsaturated constituents, particularly mineral oil fractions in which unsaturated constituents predominate. These oils may be used alone or in combination with each other or with other unsaturated organic compounds. Furthermore they may be partially or completely polymerized, oxidized, sulphonated, chlorinated, etc. Particularly desirable products are obtained from blown oils, boiled linseed oil, linoxyne, rubber-like products, and the like.

In certain cases other unsaturated organic compounds of different types may be used to advantage as, for example, intermediate products from the inter-condensation of aldehydes or from the condensation of aldehydes with phenols, ureas, and the like, as well as polymerized derivatives of such condensation products.

One method of preparing mixed polymers in accordance with the invention comprises subjecting mixtures of monomeric chloroprene and one or more unsaturated organic compounds to a joint polymerization process. Similar products may likewise be obtained by polymerizing one of the components in the presence of another component which has already been partially or completely polymerized. In certain cases it is also possible to prepare a homogeneous mixed polymer merely by thoroughly mixing the previously polymerized components.

The following examples illustrate certain preferred embodiments of the invention. It should be understood, however, that the invention is not limited to the procedures, materials, or quantities set forth in these examples, but includes all such modifications and variations as fall within the scope of the appended claims. All quantities given in the examples are parts by weight.

Example 1

A mixture of 100 parts of chloroprene and 100 parts of boiled linseed oil are heated to 60–70° C. The resultant product is a viscous polymer which is soluble in the common lacquer solvents. Lacquers thus produced, with or without the addition of fillers, pigments, softening agents, siccatives and/or other ingredients commonly used in lacquer compositions, give quick-drying films of superior adhesive power, elasticity and durability.

Example 2

A mixture of 75 parts of chloroprene and 100 parts of Chinawood oil are blown with air at room temperature. Within 24 hours there is obtained a viscous polymer which is somewhat less viscous than that obtained by the procedure of Example 1. This composition likewise forms a superior lacquer base and yields films distinguished by exceptional weathering qualities.

Example 3

A mixture of 200 parts of chloroprene and 100 parts of Chinawood oil is slowly heated and finally brought up to a temperature of about 70° C. There is thus obtained a solid polymer which is particularly suitable for use as a binding agent for pressed masses such as phonographic records.

Example 4

A mixture of 1000 parts of vinyl acetate, 250 parts of chloroprene and ½ part of benzoyl peroxide is heated to a temperature of 60–70° C. There is thus obtained a product which differs from polyvinyl acetate in being, inter alia, appreciably less viscous and in possessing greatly increased stability at low temperatures. A very substantial modification of the properties of polyvinyl acetate may likewise be obtained in the same manner, using even considerably smaller proportions of chloroprene.

Example 5

A mixture of 1000 parts of chloroprene, 200 parts of vinyl acetate and 0.2 part of benzoyl peroxide is gradually heated to a temperature of 60–70° C. The resultant mixed polymer does not have the tendency to deteriorate on aging which is characteristic of polymeric chloroprene. Even with the addition of considerably smaller amounts of vinyl acetate, the ageing properties of chloroprene may be improved very substantially.

Example 6

A mixture of 70 parts of vinyl chloride and 300 parts of chloroprene is polymerized by heating in an autoclave until gaseous vinyl chloride is no longer present in the mixture. The resultant polymer differs from polyvinyl chloride in that it possesses much greater elasticity and flexibility, as well as other properties which make it superior to vinyl chloride for the production of many types of synthetic materials.

Example 7

A mixture of 1000 parts of vinyl butyrate, 200 parts of chloroprene, 0.5 part of benzyl peroxide, 1000 parts of water, and 0.5 part of a partially saponified polyvinyl acetate (saponified to a saponification number of 80 to 100) is heated with strong agitation to a temperature of 60 to 70° C. There is thus obtained a pulverant mixed polymer which has no tendency to adhere to the walls of the vessel, and which is readily separated from the mother liquor by filtration. The product is in the form of globular or lenticular particles, the size of which depends upon the amount of agitation employed during the polymerization processes. Upon standing, there is no tendency for the particles to coalesce or cake together. Although this product is of a somewhat higher degree of polymerization than that obtained by the process of Example 4, it exhibits the same excellent solubility in lacquer solvents and other advantageous properties.

Example 8

The procedure of Example 7 is carried out using 2 parts of partially saponified polyvinyl acetate instead of 0.5 part. By maintaining adequate agitation during the polymerization process, there is obtained a stable emulsion resembling rubber latex. If desired, the solid product can be separated from this emulsion by the usual methods employed in clarifying or coagulating natural latex, or the emulsion can be used directly for lacquer and coating compositions, etc., in the same manner as solutions obtained by dissolving the products of Example 7 in organic solvents.

Example 9

A mixture of 500 parts by weight of chloroprene, 500 parts by weight of ethyl acrylate, 1500 parts of water and 1 part of 30% hydrogen peroxide solution is slowly heated, with thorough agitation, until a temperature of 60° C. is reached. This temperature is maintained until a partial polymer of medium viscosity is obtained. There is then added to the mixture 6 parts of a formaldehyde polyvinyl acetal which has been previously saponified to the point where it becomes soluble in water; heating and agitation is continued with the gradual addition of another part of 30% hydrogen peroxide until the mixture is free from monomers. There is thus obtained a mixed polymer in the form of a stable latex which can be used directly for the production of films and coatings of high elasticity, pliability and resistivity to chemical action.

Example 10

A mixture of 750 parts by weight of vinyl chloride, 250 parts of chloroprene, 1000 parts of water and 0.5 part of a polymerized vinyl-ethyl ether which has been saponified sufficiently to become water soluble, is heated in an autoclave with thorough agitation until monomeric vinyl chloride is no longer present in the mixture. There is thus obtained a fine pulverant mixed polymer which has no tendency to adhere to the walls of the autoclave and which may readily be separated from the mother liquor by filtration. The product is highly polymerized, possesses excellent elasticity, pliability, and stability at low temperatures, and is an excellent synthetic resin for many types of uses.

The procedures set forth in the above examples may be varied in many particulars. For example, one component of the mixture can be partially polymerized by itself and the polymerization then completed in conjunction with another component, so that both are polymerized together. Also, both components can be polymerized to a certain degree and then admixed for the final stages of polymerization. In certain cases, polymerization of each of the components may be completed separately, and the polymers combined in a plastified, fused, dissolved, or emulsified condition. The combination of various polymers by these methods is usually facilitated by the use of emulsifying agents. The most suitable emulsifying agents for this purpose are those which do not exert any saponifying action upon the compounds being polymerized. For this purpose we prefer to use the more or less water-soluble derivatives of polyvinyl alcohol which are obtained by partial saponification of polyvinyl ethers, esters, or acetals or water-soluble, ether-like cellulose derivatives. A simple and convenient form of preparing mixtures of polymers or materials to be polymerized consists in the formation of latex-like emulsions which are readily produced with the aid of emulsifying agents of the aforementioned types. The resultant mixed latex may be used as such, or the solid mixed polymers may be separated therefrom by clarification or coagulation in the manner commonly employed with natural rubber latex.

The compositions of the invention are compatible with and frequently can be modified to advantage by the use of other modifying agents commonly employed in plastic technique. For example, softening agents, solvents, solvent assistants, natural and synthetic resins of all kinds, cellulose and its derivatives, oils, water-repellant substances, fillers, pigments, dyes, etc. may be added to adapt the products to any desired use. In this connection, it may be noted that fibrous fillers and waxy materials have a surprisingly great stiffening and hardening action on the compositions of the invention; this is especially true of the action of cellulose and waxes on the mixed polymers of chloroprene and vinyl compounds.

Obviously, the compositions of the invention are not limited to those which contain any particular number of components. Where it is desired to modify several different properties of the basic composition so as to adapt it to the special requirements of a particular use, this can be accomplished by incorporating therein relatively small amounts of a number of components.

I claim:

1. A method of preparing a synthetic product which comprises polymerizing an aqueous suspension of chloroprene and at least one other unsaturated polymerizable organic compound in the presence of an emulsion stabilizer comprising a partially saponified polyvinyl acetate having a saponification number of from about 80 to about 100.

2. A method of preparing a synthetic product which comprises polymerizing an aqueous suspension of chloroprene and a vinyl ester in the presence of an emulsion stabilizer comprising a partially saponified polyvinyl acetate having a saponification number of from about 80 to about 100.

3. A stable emulsion comprising a mixed polymer of chloroprene and at least one other unsaturated polymerizable organic compound suspended in an aqueous medium with an emulsion stabilizer comprising a partially saponified polyvinyl acetate having a saponification number of from about 80 to about 100.

4. A stable emulsion comprising a mixed polymer of chloroprene and a vinyl ester suspended in an aqueous medium with an emulsion stabilizer comprising a partially saponified polyvinyl acetate having a saponification number of from about 80 to about 100.

HERBERT BERG.